United States Patent

Luscher et al.

[19]

[11] Patent Number: 6,164,961
[45] Date of Patent: Dec. 26, 2000

[54] VERTICAL CONVEYING APPARATUS, CONTINUOUS FURNACE HAVING SUCH A VERTICAL CONVEYING APPARATUS, AND CARRIER THEREFOR

[75] Inventors: Bernhard Paul Luscher; Markus Luscher, both of Tauffelen, Switzerland

[73] Assignee: Lukon Paul Luscher Werke AG, Tauffelen, Switzerland

[21] Appl. No.: 09/264,134

[22] Filed: Mar. 5, 1999

[30] Foreign Application Priority Data

Mar. 5, 1998 [DE] Germany .......................... 198 09 555

[51] Int. Cl.[7] ...................................................... F27B 9/00
[52] U.S. Cl. ...................... 432/121; 432/122; 198/465.1; 414/331.17
[58] Field of Search ................................... 432/121, 122, 432/5, 6; 198/465.1; 414/331.14, 331.17, 160

[56] References Cited

U.S. PATENT DOCUMENTS 2,897,772  8/1959  Hunter ................................. 198/465.1
5,473,978  12/1995  Colombo .............................. 198/465.3

Primary Examiner—Denise L. Ferensic
Assistant Examiner—Jiping Lu
Attorney, Agent, or Firm—Oblon, Spivak, McClelland, Maier & Neustadt, P.C.

[57] ABSTRACT

A vertical conveying apparatus is used particularly advantageously in a vertical continuous furnace, for example, in semiconductor production. Since rubbing contacts are avoided and there is thus barely any wear, continuous furnaces provided therewith are particularly suitable for the sensitive semiconductor products and production processes. Since no lateral guides are necessary for the specially designed carriers in the case of relatively small and average stack heights, there is no rubbing contact in the furnace region either, and wear is thus completely avoided. Furthermore, the invention is distinguished by its mechanical simplicity, which has advantages, in particular as far as durability and maintenance are concerned. The absence of retaining or transporting beams in the furnace region makes it possible to achieve a wide variety of different temperature zones over the vertical height of the stack. Heat losses as a result of the retaining and transporting beams passing through the different heating and temperature zones do not occur. Likewise, the absence of retaining and transporting beams has the benefit that the hot air from the fan heaters cannot be covered over and this arrangement has a positive effect on the temperature homogeneity.

15 Claims, 6 Drawing Sheets

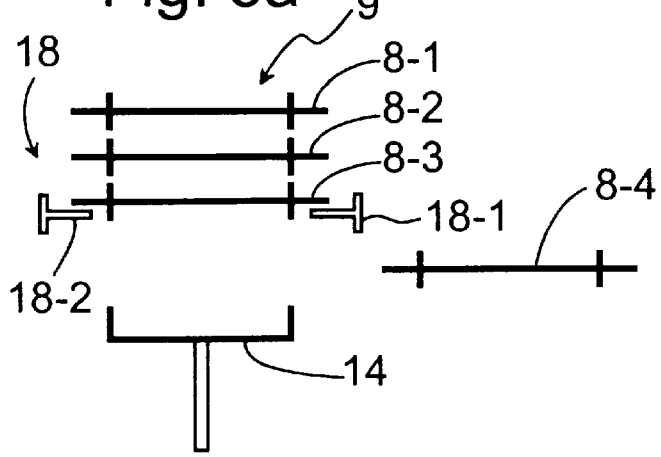
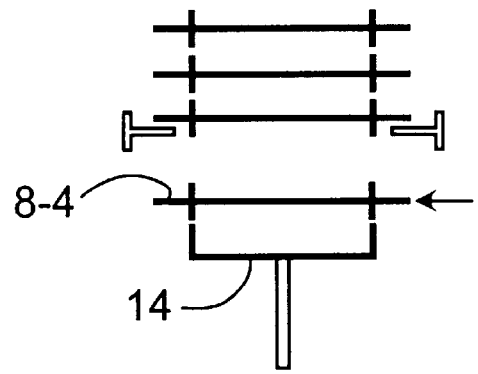
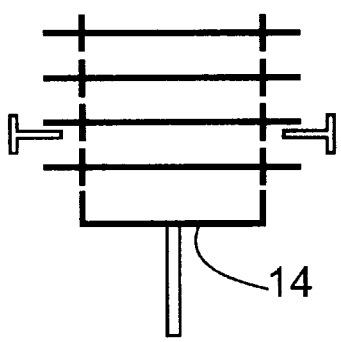
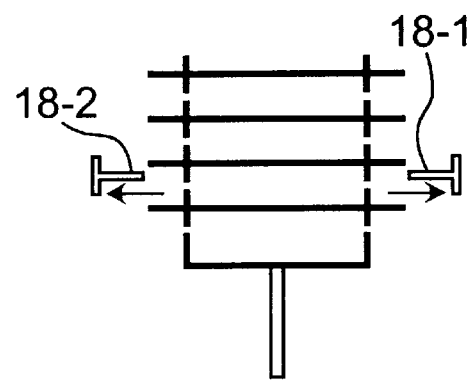
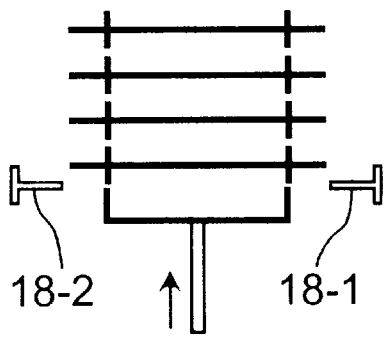
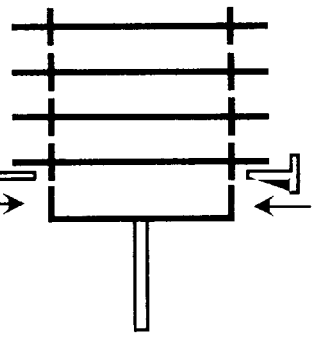
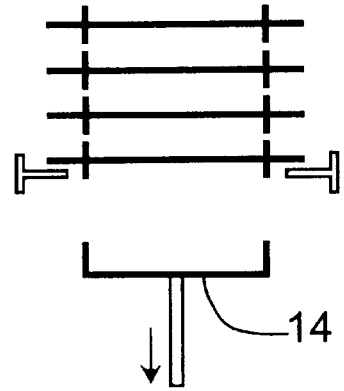

VERTICAL CONVEYING APPARATUS, CONTINUOUS FURNACE HAVING SUCH A VERTICAL CONVEYING APPARATUS, AND CARRIER THEREFOR

CROSS REFERENCE TO RELATED APPLICATION

This application claims the benefit of priority under 35 U.S.C. 119 of German Patent Application Serial No. 19809555.4-22 filed on Mar. 5, 1998, the entire contents of which is incorporated herein by reference.

BACKGROUND OF THE INVENTION

1. Field of the Invention

The invention relates to a vertical conveying apparatus for objects which are located one above the other in a stack, to a continuous furnace having such a vertical conveying apparatus, and to a carrier for such a vertical conveying apparatus.

2. Discussion of the Related Art

East German Patent Nos. 273,045 and 272,054 disclose apparatuses for vertical stacking of preferably shaped workpieces, in the case of which individual workpieces are arranged between two mutually opposite retaining beams and rest on retaining elements which are each provided for the individual workpieces. In the case of East German Patent No. 273,045, the retaining beams have circulating chains on the chain elements of which there are arranged the retaining elements in the form of projecting teeth. In the case of East German Patent No. 272,054, retaining catches for the workpieces are arranged in each case in the vertical direction on the retaining beams. In both cases, the individual workpieces are lifted from beneath into the position of the respective retaining elements by a lifting platform.

Likewise, West German Published Application No. 285, 401 discloses a vertical conveying apparatus or a stacking apparatus which is intended for flat trays and includes a retaining device with four retaining elements which are arranged laterally in relation to the stack and can be brought into engagement with the lowermost tray and can be released therefrom again. The individual trays are advanced up to a position beneath the stack by a transverse conveying device. Each tray is advanced up to the stack from beneath by a lifting device, and the latter forces away the retaining elements of the retaining device, which is subject to spring force in the lateral direction, until the retaining elements spring back again beneath the advanced tray and thus retain the lifting device and the stack.

The disadvantage of these known vertical conveying apparatuses or stacking apparatuses resides in the fact that rubbing contacts, of the chain on the retaining beams, of the catches on the workpieces and of the retaining elements during disengagement and spring-back action, produce wear, with the result that stacking apparatuses of this type cannot be used in semiconductor technology.

West German Published Application No. 196 19 486 discloses a vertical conveying apparatus and a continuous furnace equipped therewith, in the case of which the problem of wear by rubbing contacts is avoided by a walking-beam concept. The disadvantages here are the mechanical complexity and the problem of the individual fan heaters being covered over by the retaining and/or transporting beams.

Taking West German Published Application No. 285,401 as the departure point, the object of the present invention is to provide a vertical conveying apparatus in the case of which wear is minimized.

SUMMARY OF THE INVENTION

Accordingly, one object of this invention is to provide novel retaining elements which are actuated synchronously with the movement of the bottom transverse conveying device and of the lifting device by a drive device and are not, as in the case with the closest prior art, forced away counter to the spring force by the lifting platform. Rubbing contacts between the workpieces and the retaining elements of the prior art are completely avoided, and thus wear is minimized. Furthermore, the lifting device and the transverse conveying device convey the objects in two directions, i.e. from bottom to top and from top to bottom or from left to right and from right to left.

According to an advantageous configuration of the invention, the retaining elements are, in particular, in the form of retaining blades which are moved laterally back and forth in a direction perpendicular to the transporting direction and are thus brought into engagement with the objects which are to be conveyed and released therefrom again.

According to a further advantageous configuration of the invention, the objects which are to be conveyed are carriers in which the products which are actually to be conveyed are arranged. The retaining blades or retaining elements engage in corresponding recesses in the carriers. The carriers include spacers with top and bottom contact regions on which the individual carriers in the stack are located one above the other or on which two directly adjacent carriers are in mechanical contact. The height of the spacers in the transporting direction determines the step height of the conveying apparatus. It is thus possible, by way of suitable carriers, for the vertical conveying apparatus of the present invention to be used for different products.

The vertical conveying apparatus according to the present invention can be used particularly advantageously in a vertical continuous furnace, as are used, for example, in semiconductor production. Since, in the case of the conveying apparatus according to the invention, rubbing contacts are avoided and there is thus barely any wear, continuous furnaces provided therewith are particularly suitable for the sensitive semiconductor products and production processes. Since no lateral guides are necessary for the specially designed carriers in the case of relatively small and average stack heights, there is no rubbing contact in the furnace region either, and wear is thus completely avoided. Furthermore, the invention is distinguished by its mechanical simplicity, which has advantages, in particular, as far as durability and maintenance are concerned. The absence of retaining or transporting beams in the furnace region makes it possible to achieve a wide variety of different temperature zones over the vertical height of the stack. Heat losses as a result of the retaining and transporting beams passing through the different heating and temperature zones (such as those described in West German Published Application No. 196 19 486) do not occur. Likewise, the absence of retaining and transporting beams means that the hot air from the fan heaters cannot be covered over and this arrangement has a positive effect on the temperature homogeneity.

Further details, features and advantages of the invention can be gathered from the following description of an exemplary embodiment of the invention with reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 3a to 3g show schematic illustrations for the purpose of explaining the transporting sequence of the vertical conveying apparatus according to the present invention.

DESCRIPTION OF THE PREFERRED EMBODIMENTS

Figure 1:
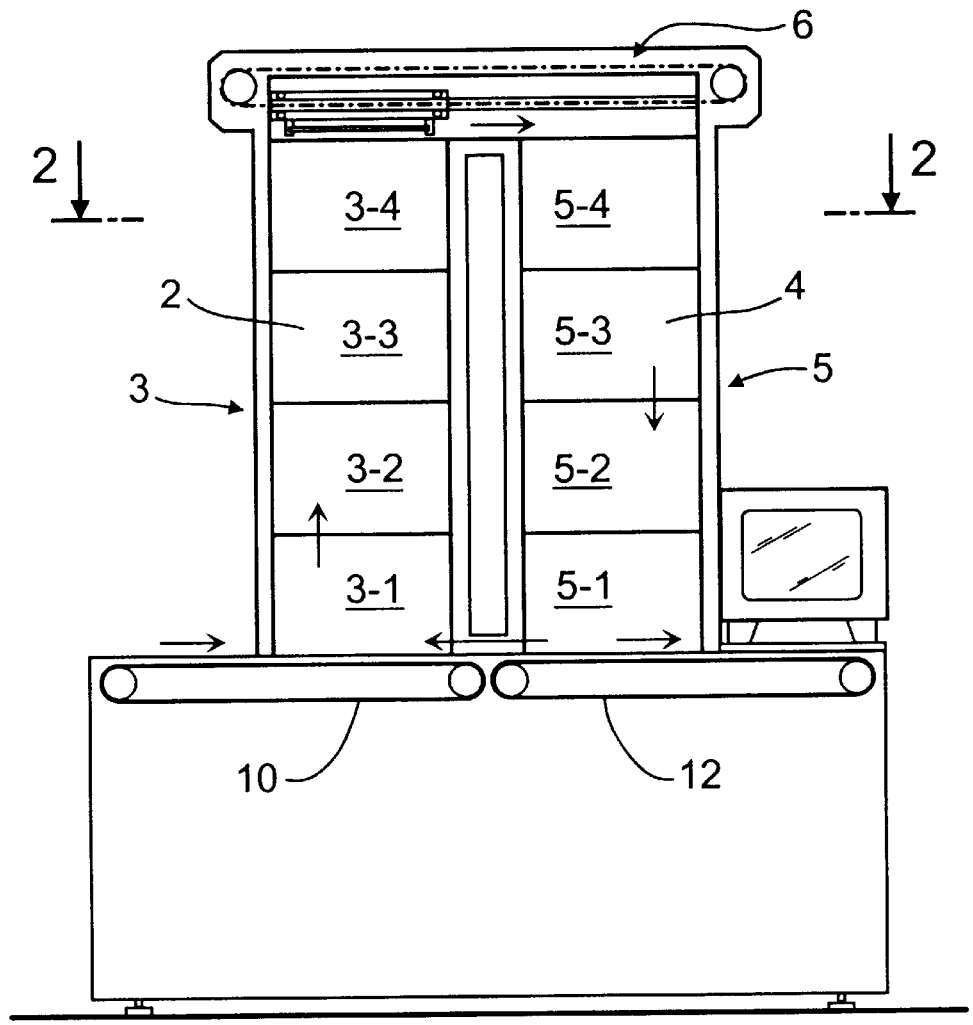
FIG. 1 shows a schematic side view of a vertical continuous furnace having two vertical conveying apparatuses arranged one beside the other.
Figure 2:
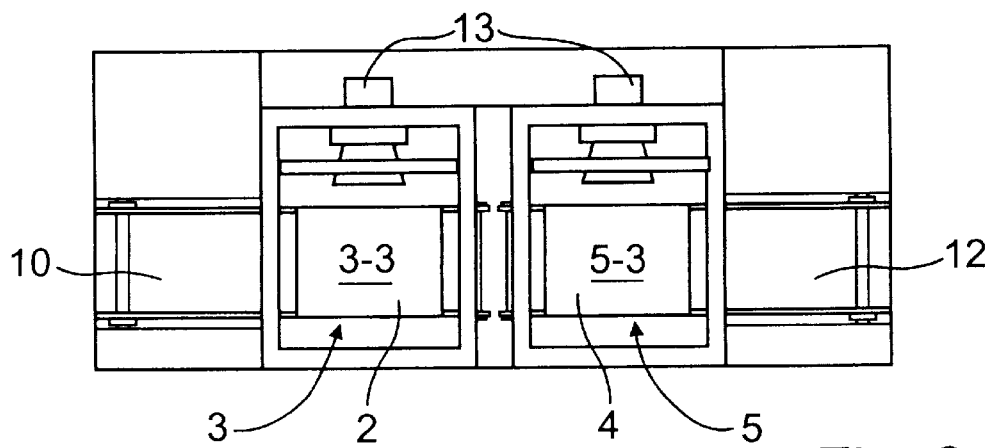
FIG. 2 shows a section through the illustration according to FIG. 1 along the line A—A.

Referring now to the drawings, wherein like reference numerals designate identical or corresponding parts throughout the several views, FIG. 1 shows a schematic side view of an exemplary embodiment of a vertical continuous furnace according to the present invention. FIG. 2 shows an associated sectional view along the line A—A in FIG. 1. The vertical continuous furnace illustrated in FIGS. 1 and 2 includes a first vertical conveying apparatus 2 and a second vertical conveying apparatus 4, which respectively pass through a first furnace region 3 and a second furnace region, each with four temperature or heating zones 3-1, 3-2, 3-3, 3-4, 5-1, 5-2, 5-3 and 5-4. Arranged at the top ends of the two furnace regions 3 and 5, or of the two vertical conveying apparatuses 2 and 4 respectively, there is a top transverse conveying device 6 by which carriers (not shown) are conveyed upwards in the first vertical conveying apparatus 2 and then are transported from the first vertical conveying apparatus 2 to the second vertical conveying apparatus 4. The first vertical conveying apparatus 2 has an associated first bottom transverse conveyer 10 which feeds the carriers into a position thereunder. Likewise, the second vertical conveying apparatus 4 has an associated second bottom transverse conveyer 12 which transports the carriers away to the right. The first and second vertical conveying apparatuses 2 and 4 differ merely in the transporting direction. The top transverse conveying device 6 is preferably designed in accordance with the transverse conveying device described in the simultaneously filed West German Unpublished Application No. 19809556.2. Alternatively, it is also possible to use the transverse conveying device known from West German Published Application No. 196 19 485.

FIG. 2 illustrates two fans 13 for the two heating zones 3-3 and 5-3. These fans 13 are operated for either heating and/or cooling the furnace regions 3 and 5.

The basic construction and the transporting sequence of the vertical conveying apparatus according to the present invention will be described hereinbelow with reference to FIGS. 3a to 3g. The vertical conveying apparatus illustrated schematically in FIG. 3a includes, by way of example, four carriers 8-1, 8-2, 8-3 and 8-4, which form a stack 9, also a lifting device 14 for lifting the carriers up to the stack 9 or for removing the carriers from the underside of the stack 9, and a retaining device with two retaining elements 18-1 and 18-2. The associated transverse conveying devices 10 and 12 for respectively feeding the carriers to the underside of the stack 9 and guiding the carriers away from the underside of the stack 9 are not shown in FIG. 3.

FIG. 3a shows the stack 9 with the three carriers 8-1, 8-2 and 8-3, the lowermost carrier 8-3 being retained by the retaining elements 18-1 and 18-2. The lifting device 14 is in its bottom position and the carrier 8-4 is arranged laterally beneath the stack 9. FIG. 3b shows the carrier 8-4 beneath the stack 9 and the lifting device 14 already in engagement with the carrier 8-4. FIG. 3c shows the state in which the lifting device 14, which brings the carrier 8-4 into engagement with the carrier 8-3, is lifted. The retaining elements 18-1 and 18-2 still are in engagement with the carrier 8-3. FIG. 3d shows the state in which the retaining elements 18-1 and 18-2 have been moved away in the lateral direction perpendicularly to the transporting direction and the entire stack 9 is now retained by the lifting device 14. FIG. 3e shows the state in which the lifting device 14 has lifted the entire stack 9 by the height of one step. In FIG. 3f, the retaining elements 18-1 and 18-2 are brought into engagement with the now lowermost carrier 8-4. FIG. 3g shows the lifting device 14 in its lowermost position again. The stack 9 is retained by the retaining elements 18-1 and 18-2 which are in engagement with the lowermost carrier 8-4.

In accordance with this basic pattern, it is possible for a multiplicity of carriers to be stacked one above the other with the individual carriers moving upwards. Once the top end of the first vertical conveying apparatus 2 has been reached, the respectively uppermost carrier 8-1 is transported to the second vertical conveying apparatus 4 by the top transverse conveying device 6. In the second vertical conveying apparatus 4, analogously to the sequence illustrated according to FIG. 3, the individual carriers are then conveyed from top to bottom and removed or guided away by the second bottom transverse conveyer 12.

Figure 4:
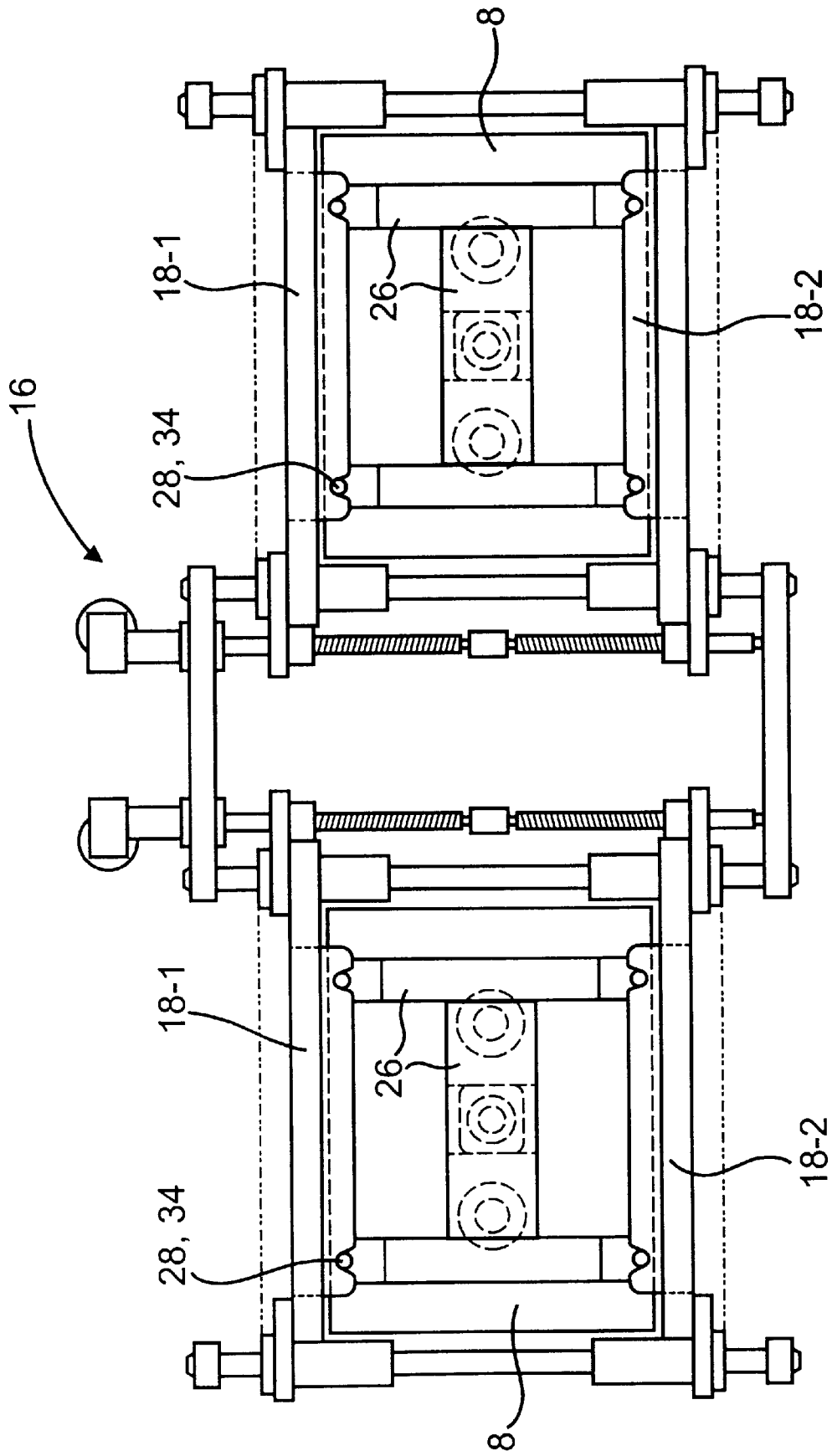
FIG. 4 shows an illustration, corresponding to FIG. 2, with details of the vertical conveying apparatus.

FIG. 4 shows a detailed illustration from above, corresponding to FIG. 2, of the vertical continuous furnace having the two vertical conveying apparatuses 2 and 4 and the two furnace regions 3 and 5. In FIG. 4, there are shown individual elements of a drive device 16 by which the two vertical conveying apparatuses 2 and 4 and the three transverse conveying devices 6, 10, and 12 of FIG. 1 are driven synchronously. The retaining elements 18-1 and 18-2 can be seen in each case as elongated blades.

Figure 5A:
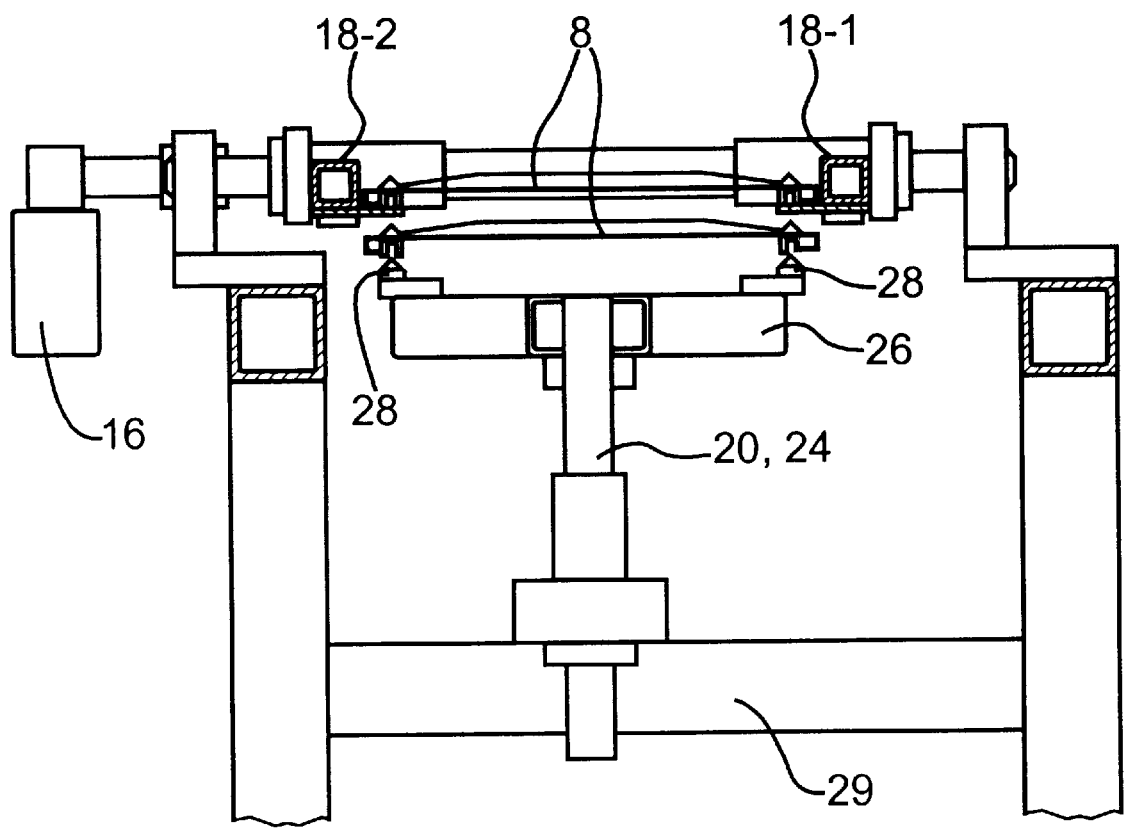
FIGS. 5a and 5b show side views of the lifting device and the retaining elements.
Figure 5B:
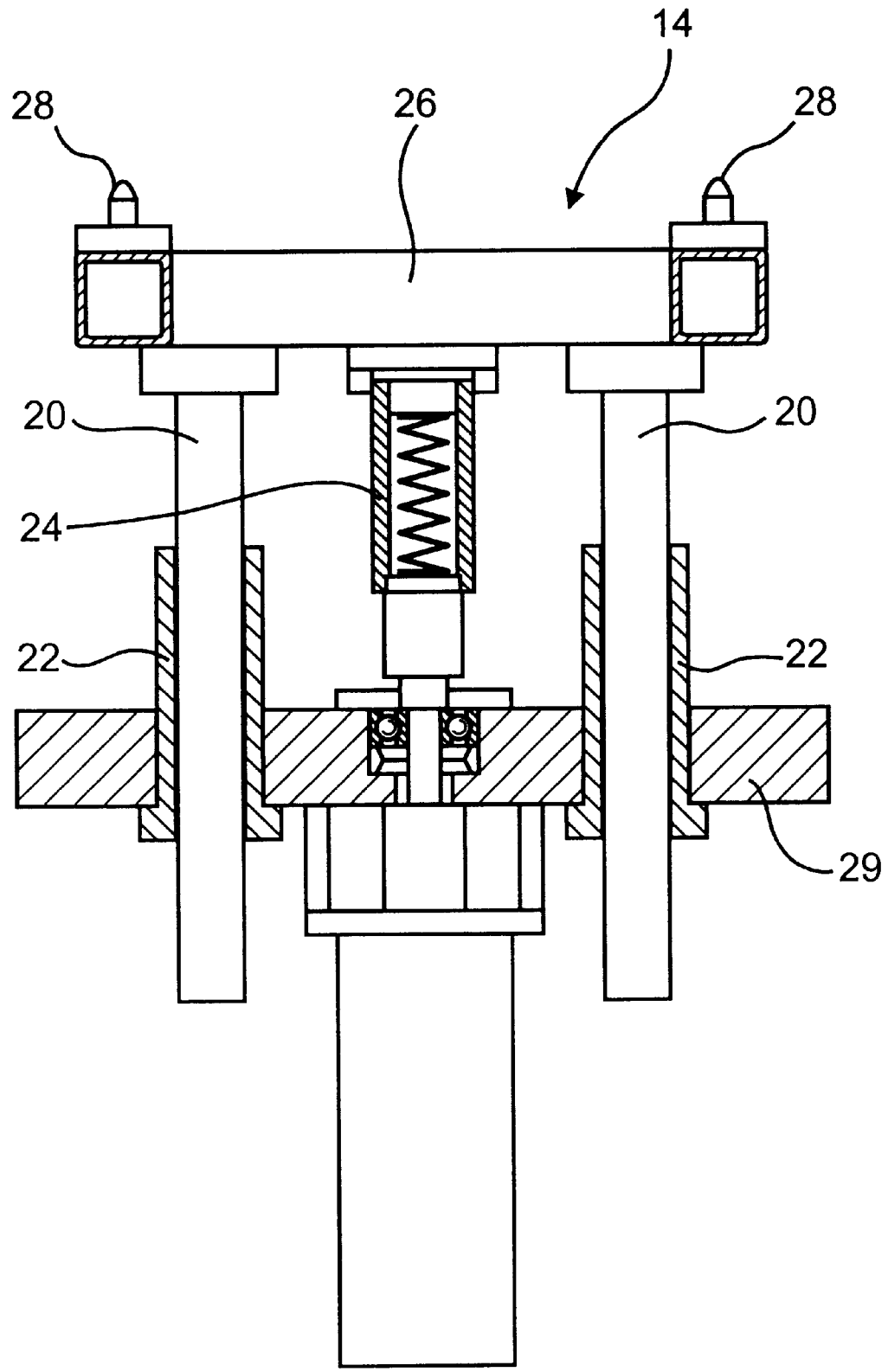

Details of the lifting device 14 can be seen from the two side views according to FIGS. 5a and 5b. In accordance with the latter, the lifting device 14 has two guide rods 20, a lifting cylinder 24 and a lifting plate 26 with four attachments 28 which act on the carriers 8 in FIG. 5a. The lifting cylinder 24 is fastened on a base plate 29. The two guide rods 20 are mounted in the base plate 29 by two slide bearings 22 seen in FIG. 5b.

Figure 6A:
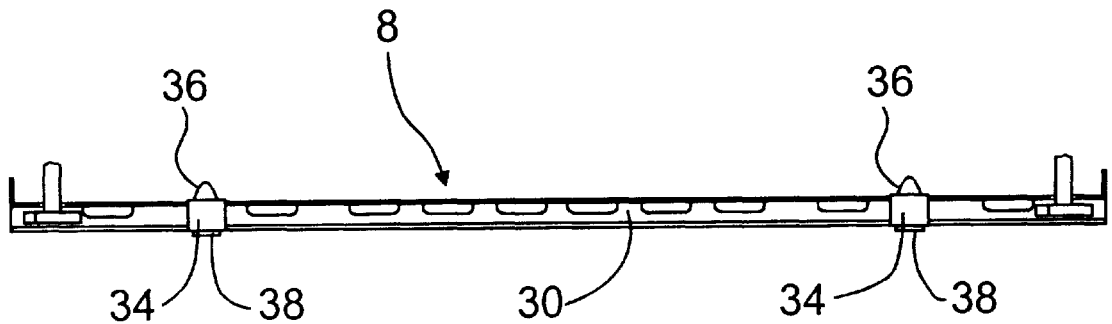
FIG. 6a shows a side view of a carrier.
Figure 6B:
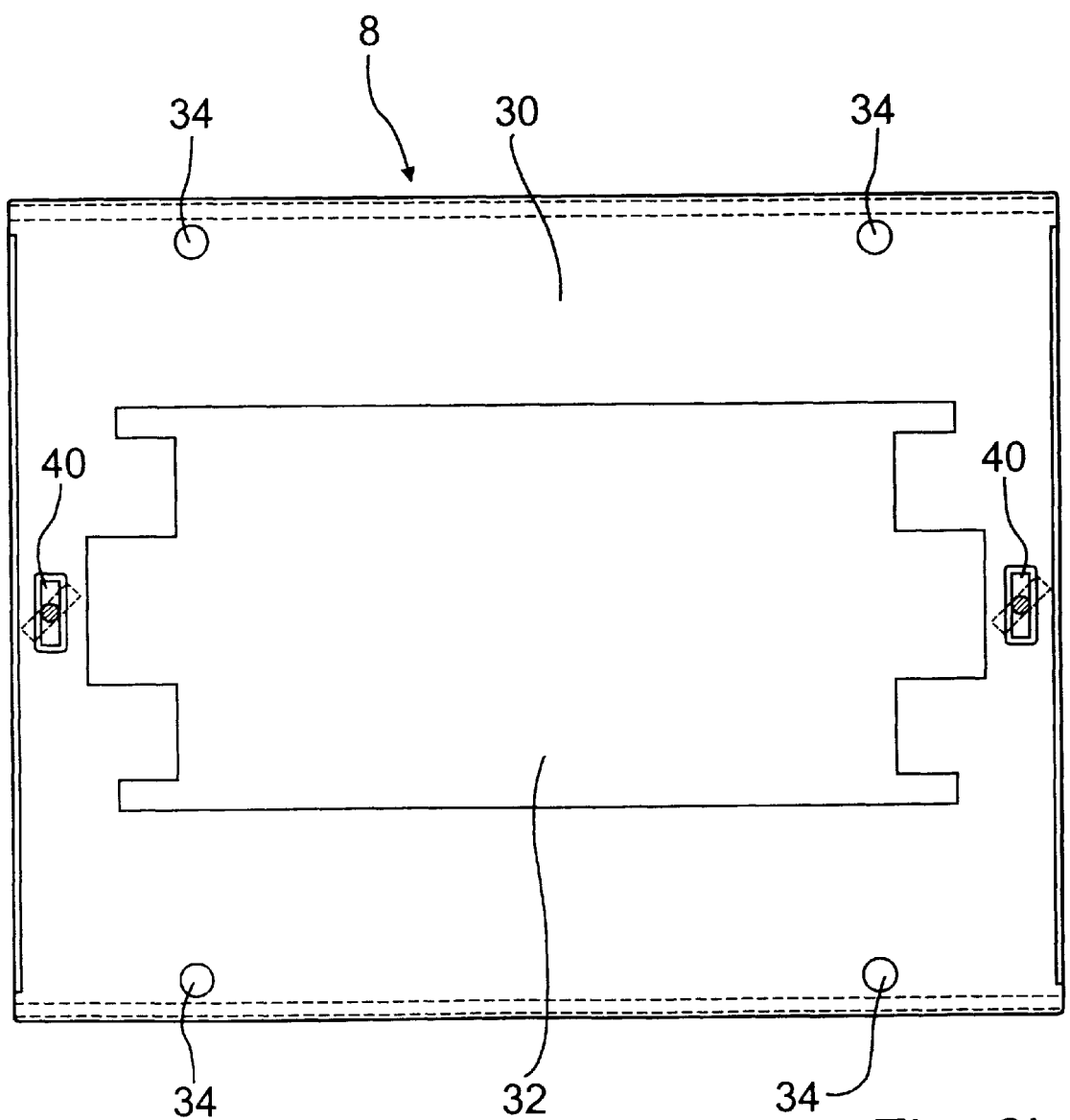
FIG. 6b shows a top view of the carrier.

FIGS. 6a and 6b show an exemplary embodiment of the carrier 8 in a side view and in a top view. Each carrier 8 has a flat rectangular carrier frame 30, which has a receiver 32 for the products which are to be conveyed, and four spacers 34, each with a top contact region 36 and a bottom contact region 38. The spacers 34 are arranged on the longitudinal side of the carrier frame 30 in the border region thereof. Provided on two shorter sides of the carrier frame 30, likewise in the border region, there are rectangular throughpassages 40 in which the top transverse conveying device 6 engages in order to transport the carriers 8 from the first vertical conveying apparatus 2 to the second vertical conveying apparatus 4 in FIG. 1. As can be seen from FIG. 6a, the spacers 34 each have a conical tip in their top contact region 36 and also have a conical recess, which matches the conical tip, in their bottom contact region 38, as a result of which the carriers 8 which are located one above the other in their respective contact regions 36 and 38 are self-centering. Consequently, depending on the dimensions of the carriers 8, it is possible to achieve comparatively high stack heights without lateral guidance of the stack 9, as shown in FIG. 3 being necessary. As seen in FIG. 5b, the attachments 28 of the lifting device 14 have conical tips, like the top contact regions 36 of the spacers 34 seen in FIG. 6a.

Other features of the invention will become apparent in the course of studying the foregoing descriptions of exemplary embodiments which are given for illustration of the invention and are not intended to be limiting thereof.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A vertical continuous furnace in which a plurality of carriers run through a vertically arranged furnace region, said continuous furnace region comprising:
   a fan for heating and cooling the furnace region alternately;
   at least one apparatus for conveying the carriers through the furnace region; and
   a transverse conveyor for removing the carriers from the furnace region;
   wherein each of the carriers includes:
      a flat carrier frame for products which are conveyed; and
      a plurality of spacers which are fastened on the carrier frame and which extend downwards and upwards from the carrier frame, each of said spacers having top and bottom contact regions on which the carrier frame is located above another in a stack.

2. A vertical continuous furnace according to claim 1, wherein said at least one apparatus includes two adjacent vertical conveying apparatuses for conveying the carriers in opposite directions and also includes a second transverse conveyer for conveying the carriers from one to the other of the two adjacent vertical conveying apparatuses.

3. A vertical continuous furnace according to claim 2, wherein the furnace region includes a plurality of temperature or heating zones.

4. A vertical continuous furnace according to claim 1, wherein the contact regions of the carrier frame are self-centering.

5. A vertical continuous furnace according to claim 4, wherein each of the top contact regions of the spacers on the carrier frame has a conical tip, and further wherein each of the bottom contact regions thereof has a conical depression.

6. A vertical continuous furnace in which a plurality of carriers run through a vertically arranged furnace region, said continuous furnace region comprising:
   a fan for heating and cooling the furnace region alternately;
   at least one apparatus for conveying the carriers through the furnace region; and
   a transverse conveyor for removing the carriers from the furnace region;
   wherein said at least one apparatus for conveying the carriers includes:
      a retaining device with at least two retaining elements, arranged laterally alongside an entire stack of the carriers, which is brought into engagement at least with a lowermost carrier in the stack and is released therefrom again;
      a bottom traverse conveying device for feeding the carriers to a position beneath the stack;
      a device for lifting up to the stack the carrier last fed by the transverse conveying device and for lifting the entire stack by a height of one step; and
      a drive device for synchronous actuation of the lifting device and the bottom transverse conveying device;
      wherein synchronously with movement of the bottom transverse conveying device and the lifting device, said retaining elements are brought into engagement with the stack and are released therefrom again by the drive device;
      said bottom transverse conveying device, with a transporting direction from bottom to top, feeds the carriers to the position beneath the stack and, with the transporting direction from top to bottom, guides the carriers away from the position beneath the stack; and
      said lifting device, with the transporting direction from bottom to top, lifts the carriers fed by the bottom transverse conveying device and, with the transporting direction from top to bottom, lowers the lowermost carrier in the stack.

7. A vertical continuous furnace according to claim 6, wherein the retaining elements are moved back and forth in a direction perpendicular to the transporting direction.

8. A vertical continuous furnace according to claim 6, wherein the retaining elements are two retaining blades which engage in a correspondingly shaped recess in the carriers which are conveyed.

9. A vertical continuous furnace according to claim 6, wherein the lifting device includes a lifting plate on which the carriers rest and also includes a mechanism for raising and lowering the lifting plate.

10. A vertical continuous furnace according to claim 9, wherein the lifting device further includes at least one guide rod which is connected to the lifting plate.

11. A vertical continuous furnace according to claim 6, wherein an extent of the vertical transporting direction of the carriers which are conveyed determines the height of one step of the lifting operation.

12. A vertical continuous furnace according to claim 11, wherein each carrier which is conveyed includes at least one product which is connected thereto in a releasable manner, and further wherein the retaining elements and the lifting device act on each carrier.

13. A vertical continuous furnace according to claim 12, wherein each carrier has spacers which extend in the transporting direction and each spacer has top and bottom contact regions on which each carrier in the stack is located one above another.

14. A vertical continuous furnace according to claim 13, wherein the contact regions of each carrier are self-centering.

15. A vertical continuous furnace according to claim 13, wherein the top contact region of each spacer has a conical tip and further wherein the bottom contact region of each spacer has a conical depression.

* * * * *